(No Model.) 2 Sheets—Sheet 1.

W. SOMERVILLE, Sr., R. M. SOMERVILLE, & W. SOMERVILLE, Jr.
PORTABLE BATH FOR ANIMALS.

No. 301,637. Patented July 8, 1884.

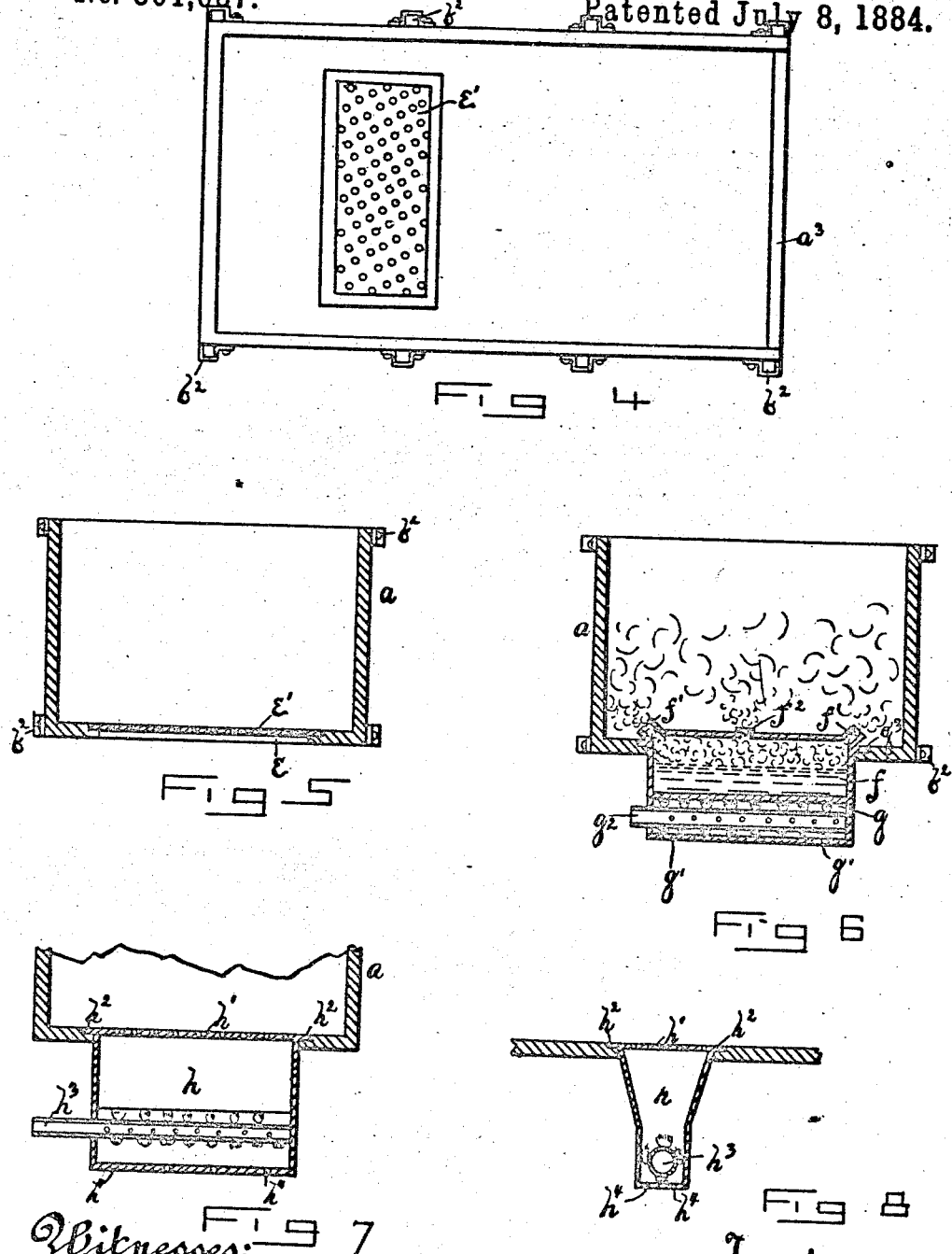

UNITED STATES PATENT OFFICE.

WILLIAM SOMERVILLE, SR., ROBERT M. SOMERVILLE, AND WILLIAM SOMERVILLE, JR., OF BUFFALO, NEW YORK.

PORTABLE BATH FOR ANIMALS.

SPECIFICATION forming part of Letters Patent No. 301,637, dated July 8, 1884.

Application filed December 26, 1883. (No model.)

*To all whom it may concern:*

Be it known that we, WILLIAM SOMERVILLE, Sr., ROBERT M. SOMERVILLE, and WILLIAM SOMERVILLE, Jr., citizens of the United States, residing at Buffalo, in the county of Erie and State of New York, have invented certain new and useful Improvements in Portable Baths for Animals; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention has for its object to provide a portable vapor or hot-air bath for animals, particularly horses; which can be easily and rapidly transported to any point desired, and can be quickly and readily adapted for the remedial purposes for which it is intended; and to these ends it consists, broadly, of a suitably covered and inclosed vehicle provided with means for the generation of the remedial agent, the vehicle being adapted for the proper reception of the animal to be treated.

We will now proceed to more definitely describe the manner in which we prefer to carry out our invention, it being understood that it is susceptible of considerable variation therefrom and modification thereof without departing from its limits.

Figure 1:
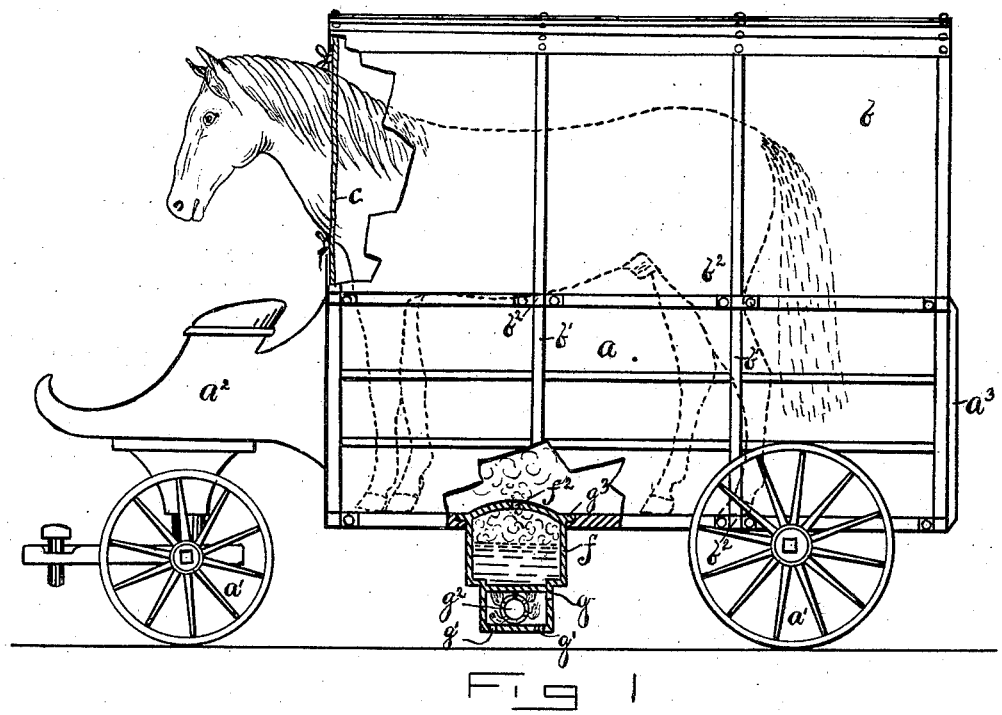
Figures 2, 3:
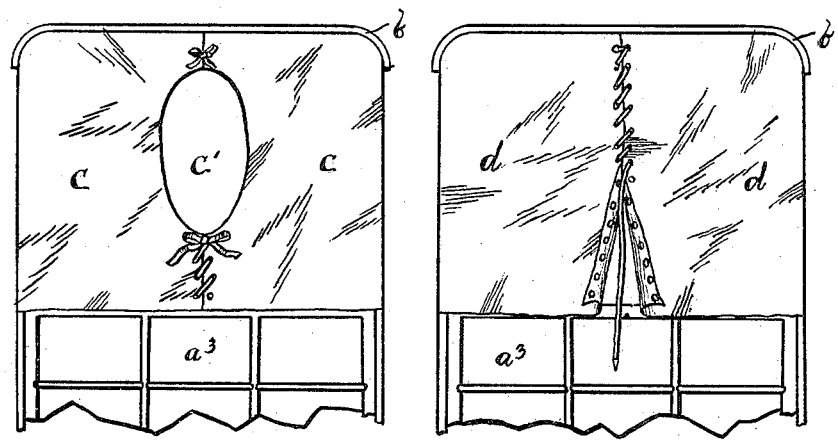

In the drawings, Figure 1 is a side elevation of our improved portable bath, illustrating its operation. Fig. 2 is a front view of a portion thereof. Fig. 3 is a rear view of a portion thereof. Fig. 4 is a top plan view of the floor of the vehicle. Fig. 5 is a vertical transverse section of the body of the vehicle. Fig. 6 is a similar section showing a steam or vapor generator in position and operation. Fig. 7 is a similar section showing a hot-air generator in position, and Fig. 8 is an end view of Fig. 7.

Referring to the drawings, $a$ is the main body of the vehicle, which is mounted upon wheels $a'$, and provided with seat $a^2$ for driver; and $a^3$ is the removable rear piece. $b$ is a removable cover, having the side extensions, $b'$, which pass into the sockets $b^2$ upon the sides of the main body $a$ and serve to hold the cover in position. This cover $b$ is provided in front with the curtains $c\ c$, as clearly shown in Fig. 2, adapted to be laced or otherwise secured, and cut away, as shown at $c'$, to accommodate the neck of the animal. At the rear end of the cover $b$ are the curtains $d\ d$, which, when laced together or otherwise secured, entirely close the rear end of the vehicle from its top to the removable rear piece, $a^3$.

As clearly shown in Figs. 4 and 5, the floor of the vehicle is provided toward its forward end with a shouldered opening, $e$, of rectangular or other shape, in which rests a removable grating or cover, $e'$.

Referring to Figs. 1 and 6, $f$ is a rectangular metallic chamber, having its top wall provided with the side apertures, $f'\ f'$, and the central aperture, $f^2$. This chamber is designed for the reception of water or any other remedial liquid. Below it is the auxiliary chamber $g$, provided with the ventilating-openings $g'$, in which is secured the perforated gas-pipe $g^2$.

The device just described is intended for the steam-generator, and its flange $g^3$ is adapted to fit and rest upon the shoulder of the opening $e$ in the floor of the vehicle after the grating $e'$ has been removed.

In Figs. 7 and 8 are shown, respectively, longitudinal and transverse sections of a hot-air generator, also adapted to rest in the shouldered opening $e$, and which consists of a chamber, $h$, having the perforated top $h'$ and flange $h^2$. In the lower part of this chamber is secured the perforated gas-pipe $h^3$.

The construction just described we have found in practice to be well suited for the successful accomplishment of our invention, the operation of which is as follows: The steam or hot-air generator is adjusted to its position in the opening $e$. The rear piece, $a^3$, being removed, and the curtains $d\ d$ being thrown back, the sick animal is led into the covered vehicle, its head being allowed to project beyond the curtains $c\ c$, which are secured around its neck, as clearly shown in Fig. 1. The rear piece, $a^3$, is next placed into position and the curtains $d\ d$ secured in closed position, thus inclosing the entire body of the animal, with the exception of its head. If the steam-generator is employed, the perforated pipe $g^2$ is attached to the gas pipe or fixture and the escaping gas lighted within the chamber $g$. The chamber $f$ having been previously filled with water or other desirable fluid, the heat generated below will convert the contents of chamber $f$ into a vapor, which, rising through the apertures $f'\ f'\ f^2$, as shown in Figs. 1 and 6, fills the space surrounding the animal and effects the purpose for which it is intended. The hot-air generator is operated in substantially the same manner, the air entering through the perforations $h^4$ in the bottom of the chamber $h$, and, after being heated, passing up through the perforations $h'$ and into the closed vehicle. It will be seen that by reason of the location of the apertures $f'\ f'\ f^2$ the ascending vapor is thrown in contact with the belly of the animal and passes up on either side, thus making the action of the vapor more effective.

While we have, by preference, herein shown and described a particular arrangement of vehicle and generators, we do not wish to be understood as limiting our invention to such construction, as the general details might be varied considerably without departing from the spirit of our invention—for example, other forms of generators, accomplishing the same result, might be employed with differently-constructed vehicles, and the vapor or hot air might be introduced at other points than through the opening $e$ in the floor of the vehicle.

Our invention is intended, especially, for use by veterinary doctors in cases where it is not possible to move the sick animal without injury thereto, or where it becomes a matter of considerable trouble and expense to take the animal any distance, as it has heretofore been necessary in order to subject the animal to a vapor or hot-air bath, as the appliances therefor, prior to our invention, have always been a permanent feature of the veterinary doctor's establishment.

We claim—

1. A portable vapor or hot-air bath for animals, consisting of a vehicle provided with means for inclosing the entire body of the animal, with the exception of the head, and a removable vapor or hot-air generator adapted to be placed in an orifice in the floor of the vehicle, substantially as described.

2. In a portable or hot-air bath for animals, in combination, the covered vehicle $a\ b$, having the shouldered opening $e$ in its floor, and a removable vapor or hot-air generator adapted to be placed within such shouldered opening, as and for the purpose stated.

3. In a portable vapor or hot-air bath for animals, the vapor-generator $f\ g$, having the side and central apertures, $f'\ f^2$, for the escape of vapor within the vehicle, as and for the purpose stated.

In testimony whereof we have signed our names to this specification in the presence of two subscribing witnesses.

WILLIAM SOMERVILLE, Sr.
  ROBERT M. SOMERVILLE.
  WILLIAM SOMERVILLE, Jr.

Witnesses:
 GEORGE HOSLEY,
 W. T. MILLER.